(12) United States Patent
Wang et al.

(10) Patent No.: US 12,495,147 B2
(45) Date of Patent: Dec. 9, 2025

(54) IMAGE PROCESSING METHOD AND SYSTEM, ENCODER, AND COMPUTER READABLE STORAGE MEDIUM

(71) Applicant: CHINA TELECOM CORPORATION LIMITED, Beijing (CN)

(72) Inventors: Huifen Wang, Beijing (CN); Yuan Zhang, Beijing (CN); Mingchuan Yang, Beijing (CN); Leping Shen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 158 days.

(21) Appl. No.: 18/553,001

(22) PCT Filed: Dec. 2, 2021

(86) PCT No.: PCT/CN2021/134996
§ 371 (c)(1),
(2) Date: Sep. 28, 2023

(87) PCT Pub. No.: WO2022/205987
PCT Pub. Date: Oct. 6, 2022

(65) Prior Publication Data
US 2024/0195980 A1  Jun. 13, 2024

(30) Foreign Application Priority Data
Mar. 30, 2021  (CN) .......................... 202110339327.1

(51) Int. Cl.
H04N 19/14   (2014.01)
H04N 19/124  (2014.01)
(Continued)

(52) U.S. Cl.
CPC .......... *H04N 19/14* (2014.11); *H04N 19/124* (2014.11); *H04N 19/42* (2014.11); *H04N 19/91* (2014.11)

(58) Field of Classification Search
None
See application file for complete search history.

(56) References Cited

U.S. PATENT DOCUMENTS

| | | |
|---|---|---|
| 2017/0353737 A1 | 12/2017 | Lin et al. |
| 2018/0173994 A1 | 6/2018 | Rippel et al. |
| 2020/0374522 A1 | 11/2020 | Zhou et al. |

FOREIGN PATENT DOCUMENTS

| | | |
|---|---|---|
| CN | 1909535 A | 2/2007 |
| CN | 107301668 A | 10/2017 |

(Continued)

OTHER PUBLICATIONS

Ko et al. ("Edge-Host Partitioning of Deep Neural Networks with Feature Space Encoding for Resource-Constrained Internet-of-Things Platforms," 2018 15th IEEE International Conference on Advanced Video and Signal Based Surveillance (AVSS), hereinafter Ko) (Year: 2018).*

(Continued)

*Primary Examiner* — Samuel D Fereja
(74) *Attorney, Agent, or Firm* — Andrew M. Calderon; Calderon Safran & Wright P.C.

(57) ABSTRACT

The method of the present disclosure includes: for a feature matrix of each channel of an image output from an intermediate layer of a neural network: determining row(s) and column(s) having same feature values at edges of the feature matrix as row(s) to be compressed and column(s) to be compressed, deleting the feature values of the row(s) to be compressed and the column(s) to be compressed, and reserving remaining feature values as reserved values; compressing the feature values of the row(s) to be compressed and the (Continued)

column(s) to be compressed to obtain edge value(s); and encoding the reserved values and the edge value(s), as well as a number of the row(s) to be compressed and a number of the column(s) to be compressed, and sending a result of the encoding to a decoder for restoring the feature matrix of the each channel by the decoder.

18 Claims, 5 Drawing Sheets

(51) Int. Cl.
*H04N 19/42* (2014.01)
*H04N 19/91* (2014.01)

(56) References Cited

FOREIGN PATENT DOCUMENTS

| | | |
|---|---|---|
| CN | 109314781 A | 2/2019 |
| CN | 110263910 A | 9/2019 |
| JP | 2020191077 A | 11/2020 |
| WO | 2020190772 A1 | 9/2020 |
| WO | 2021050007 A1 | 3/2021 |

OTHER PUBLICATIONS

Decision to Grant a Patent issued Dec. 5, 2024 in JP Application No. 2023-560610, 5 pages.
Ling, Weixin et al.—(A Parallel Cooperative Modular Neural Network Classifier Based on Rough Set), (Computer Engineering and Applications), No. 23, (Dec. 1, 2002), 4 pages.
International Search Report and Written Opinion issued on Feb. 9, 2022 in corresponding Application No. PCT/CN2021/134996; 8 pages.
Ling, Weixin et al.—(A Parallel Cooperative Modular Neural Network Classifier Based on Rough Set), (Computer Engineering and Applications), No. 23, (Dec. 1, 2002), 1-16; entire document.
Decision to Grant a Patent issued Jun. 13, 2024 in CN Application No. 202110339327.1, 10 pages.
The Extended European Search Report and Opinion dated Jul. 22, 2024 in EP Application No. 21934623.6 -1203 / 4303763 PCT/CN2021134996, 12 pages.
Lin et al, "AHG9: Convolutional Neural Network Filter (CNNF) for Intra Frame", ITU-T SG 16 WP 3 and ISO/IEC JTC 1/SC 29/WVG 11 JVET-M0351, 13 th Meeting Marrakech, MA, Jan. 9-18, 2019, 7 Pages.
Ko et al, "Edge-Host Partitioning of Deep Neural Networks with Feature Space Encoding for Resource-Constrained Internet-of-Things Platforms", https://ieeexplore.ieee.org/document/8639121, Nov. 27-30, 2018, 6 Pages.

\* cited by examiner

For a feature matrix of various channels of an image that is outputted at an intermediate layer of a neural network, determine rows and columns having the same feature value at the edge of the feature matrix as rows to be compressed and columns to be compressed — S102

Delete feature values of the rows to be compressed and the columns to be compressed, and reserve remaining feature values as reserved values of the feature matrix of the channels — S104

Compress the feature values of the rows to be compressed and the columns to be compressed, and obtain an edge value of the feature matrix of the channels — S106

After encoding the reserved values and the edge value of the feature matrix of various channels, the quantity of rows to be compressed, and the quantity of columns to be compressed, send same to a decoder, — S108

The decoder decodes received data to obtain the compressed reserved values and the one or more compressed edge values of the feature matrix of the each channel, as well as the number of the one or more rows to be compressed and the number of the one or more columns to be compressed — S302

The decoder decompresses the compressed reserved values and the one or more compressed edge values of the feature matrix of the each channel to obtain the decompressed reserved values and the one or more decompressed edge values of the feature matrix of the each channel — S304

For the feature matrix of the each channel, the decoder pads with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel — S306

IMAGE PROCESSING METHOD AND SYSTEM, ENCODER, AND COMPUTER READABLE STORAGE MEDIUM

CROSS-REFERENCE TO RELATED APPLICATIONS

The present disclosure is a U. S. National Stage Application under 35 U.S.C. § 371 of International Patent Application No. PCT/CN2021/134996, filed on Feb. 12, 2021, which is based on and claims priority of Chinese application for invention No. 202110339327.1 filed on Mar. 30, 2021, the disclosures of both of which are hereby incorporated into this disclosure by reference in its entirety.

TECHNICAL FIELD

The present disclosure relates to the field of computer technology, in particular to an image processing method, system, encoder, and computer-readable storage medium.

BACKGROUND

The Video Coding for Machines (VCM) Expert Group aims to standardize an encoding technique for a compressed video or a feature code stream extracted from a video, which can be used for various machine tasks while ensuring a high compression efficiency and a machine intelligence task performance, to serve machine vision and human-machine hybrid vision applications.

Deep learning feature encoding for machine vision can first determine a layer of a neural network where an object to be encoded is located, output feature codes from the determined layer of the neural network, which are then used in various subsequent video processing tasks.

Neural networks commonly used in the deep learning feature encoding for machine vision comprise convolutional neural networks. A padding operation is often introduced before a convolution in a convolutional neural network to add some pixels to the periphery of an image and initialize these pixels to a preset value, such as 0.

SUMMARY

According to some embodiments of the present disclosure, there is provided an image processing method, comprising, for a feature matrix of each channel of an image output from an intermediate layer of a neural network: determining one or more rows having same feature values and one or more columns having same feature values at edges of the feature matrix as one or more rows to be compressed and one or more columns to be compressed, wherein the intermediate layer is a layer between an input layer and an output layer; deleting the feature values of the one or more rows to be compressed and the one or more columns to be compressed, and reserving remaining feature values as reserved values of the feature matrix of the each channel; compressing the feature values of the one or more rows to be compressed and the one or more columns to be compressed to obtain one or more edge values of the feature matrix of the each channel; and encoding the reserved values and the one or more edge values of the feature matrix of the each channel, as well as a number of the one or more rows to be compressed and a number of the one or more columns to be compressed, and sending a result of the encoding to a decoder for restoring the feature matrix of the each channel by the decoder.

In some embodiments, the determining each row having same feature values and each column having same feature values at edges of the feature matrix comprises: selecting a feature matrix of a channel of the image output from the intermediate layer of the neural network as a feature matrix to be detected; detecting one or more rows having same feature values, downward from a first row of the feature matrix to be detected and upward from a last row of the feature matrix to be detected respectively, as the one or more rows to be compressed of the feature matrix to be detected, and detecting one or more columns having same feature values, backward from a first column of the feature matrix to be detected and forward from a last column of the feature matrix to be detected respectively, as the one or more columns to be compressed of the feature matrix to be detected; and determining one or more rows of the feature matrix of the each channel at a same location as the one or more rows to be compressed of the feature matrix to be detected as one or more rows to be compressed of the feature matrix of the each channel and determining one or more columns of the feature matrix of the each channel at a same location as the one or more columns to be compressed of the feature matrix to be detected as one or more columns to be compressed of the feature matrix of the each channel.

In some embodiments, the encoding the reserved values and the one or more edge values of the feature matrix of the each channel, as well as a number of the one or more rows to be compressed and a number of the one or more columns to be compressed comprises: compressing the reserved values and the one or more edge values of the feature matrix of the each channel in a preset method; and encoding the compressed reserved values and the one or more compressed edge values of the feature matrix of the each channel, as well as the number of the one or more rows to be compressed and the number of the one or more columns to be compressed.

In some embodiments, the compressing the reserved values and the one or more edge values of the feature matrix of the each channel in a preset method comprises: for the feature matrix of the each channel, determining an order of magnitude corresponding to the feature matrix of the each channel according to the reserved values and the one or more edge values of the feature matrix of the each channel and a preset bit depth value; and quantizing the reserved values and the one or more edge values of the feature matrix of the each channel according to the order of magnitude corresponding to the feature matrix of the each channel to obtain quantified reserved values and one or more quantified edge values as the compressed reserved values and the one or more compressed edge values of the feature matrix of the each channel.

In some embodiments, the detecting one or more rows having same feature values, downward from a first row of the feature matrix to be detected and upward from a last row of the feature matrix to be detected respectively comprises: (1) for the feature matrix to be detected, initializing a number of one or more top rows to be compressed to 0; (2) determining whether feature values of a first row are the same, and if so, increasing the number of the one or more top rows to be compressed by 1 and continuing with a next row as a current row; (3) determining whether feature values of the current row are the same as a previous row; and if so, increasing the number of the one or more top rows to be compressed by 1 and continuing with the next row as the current row; (4) repeating step (3) until the feature values of the current row are different from those of the previous row, to obtain one or more top rows to be compressed and the number of the one or more top rows to be compressed; and performing steps (1)-(4) with a matrix obtained by vertically mirroring the feature matrix to be detected as a new feature matrix to be detected, to obtain one or more top rows to be compressed and the number of the one or more top rows to be compressed, which are then used as one or more bottom rows to be compressed and a number of the one or more bottom rows to be compressed.

In some embodiments, the detecting one or more columns having same feature values, backward from a first column of the feature matrix to be detected and forward from a last column of the feature matrix to be detected respectively comprises: performing steps (1)-(4) with a matrix obtained by transposing the feature matrix to be detected as a new feature matrix to be detected, to obtain one or more top rows to be compressed and the number of the one or more top rows to be compressed, which are then used as one or more left columns to be compressed and a number of the one or more left columns to be compressed; and performing steps (1)-(4) with a matrix obtained by transposing the feature matrix to be detected and vertically mirroring the transposed matrix as a new feature matrix to be detected, to obtain one or more top rows to be compressed and the number of one or more top rows to be compressed, which are then used as one or more right columns to be compressed and a number of the one or more right columns to be compressed.

In some embodiments, the compressing the feature values of the one or more rows to be compressed and the one or more columns to be compressed to obtain one or more edge values of the feature matrix of the each channel comprises: representing the feature values of the one or more rows to be compressed and the one or more columns to be compressed with a value as the one or more edge values of the feature matrix of that channel.

In some embodiments, the encoding is entropy encoding.

In some embodiments, the method further comprises: decoding, by the decoder, received data to obtain the compressed reserved values and the one or more compressed edge values of the feature matrix of the each channel, as well as the number of the one or more rows to be compressed and the number of the one or more columns to be compressed; decompressing, by the decoder, the compressed reserved values and the one or more compressed edge values of the feature matrix of the each channel to obtain the decompressed reserved values and the one or more decompressed edge values of the feature matrix of the each channel; and for the feature matrix of the each channel, padding, by the decoder, with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

In some embodiments, the received data further comprises an order of magnitude corresponding to the feature matrix of the each channel, which is determined according to the reserved values and the one or more edge values of the feature matrix of the each channel and a preset bit depth value; and the decompressing, by the decoder, the compressed reserved values and the one or more compressed edge values of the feature matrix of the each channel comprises: for the feature matrix of the each channel, multiplying, by the decoder, the order of magnitude corresponding to the feature matrix of the each channel by the compressed reserved values and the one or more compressed edge values of the feature matrix of the each channel respectively, to obtain the decompressed reserved values and the one or more decompressed edge values of the feature matrix of the each channel.

According to other embodiments of the present disclosure, there is provided an encoder, comprising: an information-to-be-compressed determination module configured to for a feature matrix of each channel of an image output from an intermediate layer of a neural network, determine one or more rows having same feature values and one or more columns having same feature values at edges of the feature matrix as one or more rows to be compressed and one or more columns to be compressed, wherein the intermediate layer is a layer between an input layer and an output layer; a reserved value determination module configured to, for the feature matrix of the each channel, delete the feature values of the one or more rows to be compressed and the one or more columns to be compressed, and reserve remaining feature values as reserved values of the feature matrix of the each channel; an edge value compression module configured to, for the feature matrix of the each channel, compress the feature values of the one or more rows to be compressed and the one or more columns to be compressed to obtain one or more edge values of the feature matrix of the each channel; and an encoding module configured to, encode the reserved values and the one or more edge values of the feature matrix of the each channel, as well as a number of the one or more rows to be compressed and a number of the one or more columns to be compressed, and send a result of the encoding to a decoder for restoring the feature matrix of the each channel by the decoder.

According to still other embodiments of the present disclosure, there is provided an encoder, comprising: a processor; a memory coupled to the processor for storing instructions that, when executed by the processor, cause the processor to execute the image processing method of any one of the foregoing embodiments.

According to still other embodiments of the present disclosure, there is provided a non-transitory computer-readable storage medium on which a computer program is stored, wherein the program, when executed by a processor, implements the image processing method of any one of the foregoing embodiments.

According to still other embodiments of the present disclosure, there is provided an image processing system, comprising: an encoder according to any one of the foregoing embodiments; and a decoder; wherein the decoder is configured to restoring the feature matrix of the each channel according to received data sent by the encoder.

In some embodiments, the decoder is configured to decode the received data to obtain the compressed reserved values and the one or more compressed edge values of the feature matrix of the each channel, as well as the number of the one or more rows to be compressed and the number of the one or more columns to be compressed; decompress the compressed reserved values and the one or more compressed edge values of the feature matrix of the each channel to obtain the decompressed reserved values and the one or more decompressed edge values of the feature matrix of the each channel; and for the feature matrix of each channel, pad with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

In some embodiments, the received data further comprises an order of magnitude corresponding to the feature matrix of the each channel, which is determined according to the reserved values and the one or more edge values of the feature matrix of the each channel and a preset bit depth value; and the decoder is configured to for the feature matrix of the each channel, multiply the order of magnitude corresponding to the feature matrix of the each channel by the compressed reserved values and the one or more compressed edge values of the feature matrix of the each channel respectively, to obtain the decompressed reserved values and the one or more decompressed edge values of the feature matrix of the each channel.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments acquired by those of ordinary skill in the art based on the embodiments of the present disclosure without creative efforts shall fall within the protection scope of the present disclosure.

The inventors have found that in deep learning feature encoding for machine vision, due to a padding operation in a convolutional neural network, many feature values padded at edges are generated in feature codes of an image output from intermediate layers, and transmitting all these feature values padded at edges to a decoder may lead to bandwidth waste and reduce transmission efficiency.

In view of this, a technical problem to be solved by the present disclosure is: how to improve the efficiency of the transmission to the decoder and reduce bandwidth waste in the deep learning feature encoding for machine vision.

According to this disclosure, in deep learning feature encoding for machine vision, an encoder extracts feature codes of a video image and sends them to a decoder for decoding and subsequent processing. The encoder and decoder can be deployed separately, with the encoder deploying part of a neural network structure and the decoder deploying another part of the neural network structure. Based on a computing power of the encoder, a part of the neural network structure can be selected for deployment on the encoder. For example, a certain intermediate layer of the neural network and layers preceding the certain intermediate layer are deployed on the encoder, and the layers following the certain intermediate layer are deployed on the decoder. The encoder sends features output by the certain intermediate layer to the decoder for subsequent processing. This disclosure proposes an image processing method to address the issue of bandwidth waste and reduced transmission efficiency caused by large amounts of data transmitted from the encoder to the decoder, which will be described with reference to FIGS. 1-2.

Figure 1:
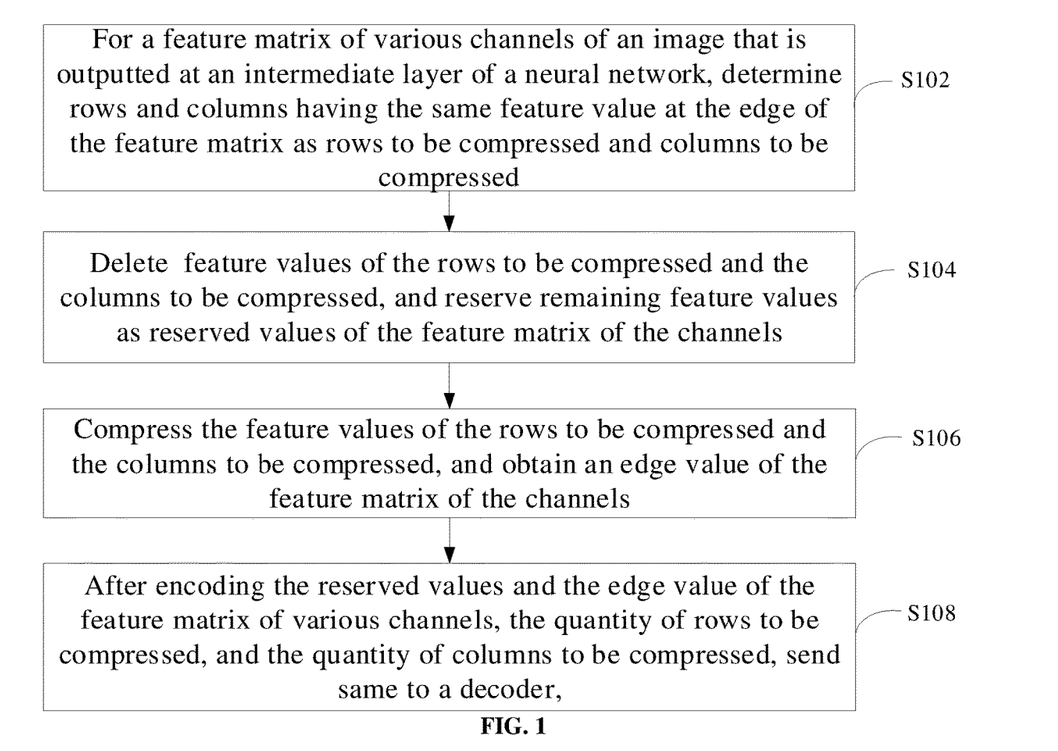
FIG. 1 shows a flowchart of an image processing method according to some embodiments of the present disclosure.

FIG. 1 is a schematic diagram of an image processing method according to some embodiments of the present disclosure. As shown in FIG. 1, the method of these embodiments comprises: steps S102 to S108.

In step S102, for a feature matrix of each channel of an image output from an intermediate layer of a neural network, one or more rows having same feature values and one or more columns having same feature values at edges of the feature matrix are determined as one or more rows to be compressed and one or more columns to be compressed.

The inventors have found that after a padding operation, rows and columns at edges of a feature matrix of an image have very similar feature values, or even multiple rows and columns have same feature values. Therefore, the feature matrix of the image can be compressed. The intermediate layer is a layer between an input layer and an output layer. In deep learning feature encoding for machine vision, the intermediate layer may be a last layer of the neural network deployed on the encoder, and may be selected based on an actual processing ability of the encoder or the others, which is not specifically limited in this disclosure.

In some embodiments, a feature matrix of a channel of the image output from the intermediate layer of the neural network is selected as a feature matrix to be detected; one or more rows having same feature values are detected downward from a first row of the feature matrix to be detected and upward from a last row of the feature matrix to be detected respectively, as the one or more rows to be compressed of the feature matrix to be detected, and one or more columns having same feature values are detected, backward from a first column of the feature matrix to be detected and forward from a last column of the feature matrix to be detected respectively, as the one or more columns to be compressed of the feature matrix to be detected; one or more rows of the feature matrix of the each channel at a same location as the one or more rows to be compressed of the feature matrix to be detected are determined as one or more rows to be compressed of the feature matrix of the each channel and one or more columns of the feature matrix of the each channel at a same location as the one or more columns to be compressed of the feature matrix to be detected are determined as one or more columns to be compressed of the feature matrix of the each channel. A feature matrix of any channel can be selected as the feature matrix to be detected.

Figure 2:
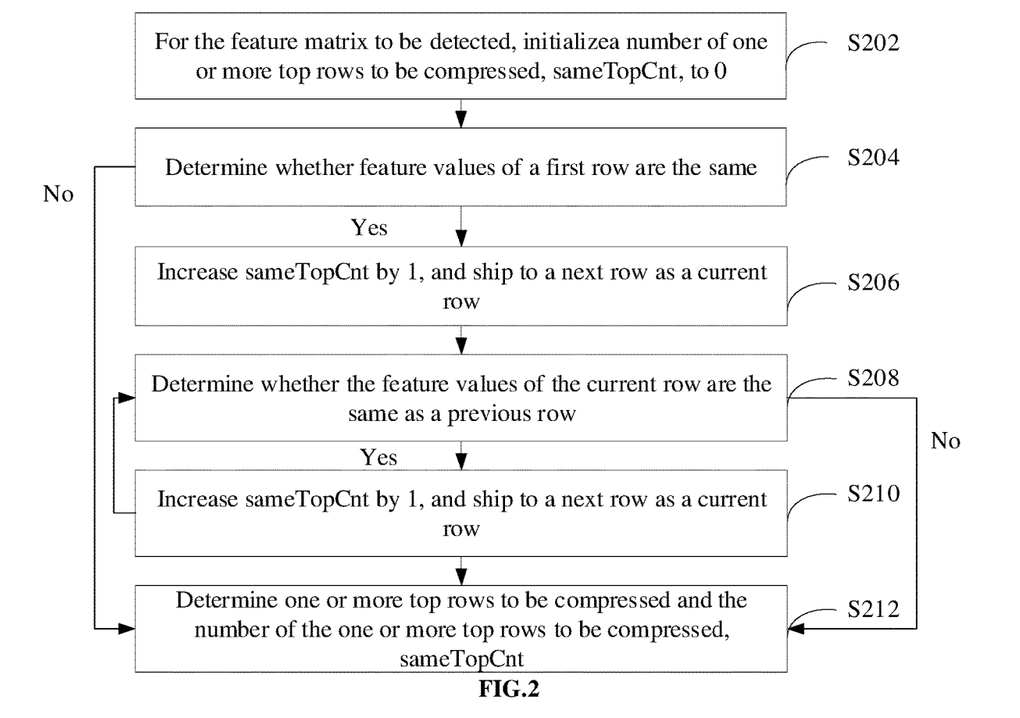
FIG. 2 shows a flowchart of an image processing method according to other embodiments of the present disclosure.

Some embodiments of how to determine the one or more rows to be compressed downwards from the first row of the feature matrix to be detected will be described below with reference to FIG. 2.

In step S202, for the feature matrix to be detected, a number of one or more top rows to be compressed, sameTopCnt, is initialized to 0.

In step S204, whether feature values of a first row are the same is determined; and if so, the method proceeds to step S206, otherwise it proceeds to step S212.

In step S206, sameTopCnt is increased by 1 and the method proceeds to step S208 with a next row as a current row.

In step S208, whether the feature values of the current row are the same as a previous row is determined; and if so, the method proceeds to step S210, otherwise it proceeds to step S212.

In step S210, sameTopCnt is increased by 1 and step S208 is repeated with the next row as the current row.

In step S212, one or more top rows to be compressed and the number of the one or more top rows to be compressed, sameTopCnt, are determined.

In some embodiments, the method of detecting one or more rows of the feature matrix to be detected having same feature values upward from a last row comprises: performing steps S202 to S208 a matrix obtained by vertically mirroring the feature matrix to be detected as a new feature matrix to be detected, to obtain one or more top rows to be compressed and the number of the one or more top rows to be compressed, which are then used as one or more bottom rows to be compressed and a number of the one or more bottom rows to be compressed, sameBotCnt.

In some embodiments, the method of detecting one or more columns of the feature matrix to be detected having same feature values backward from a first column comprises: performing steps S202 to S208 with a matrix obtained by transposing the feature matrix to be detected as a new feature matrix to be detected, to obtain one or more top rows to be compressed and the number of the one or more top rows to be compressed, which are then used as one or more left columns to be compressed and a number of the one or more left columns to be compressed, sameLeftCnt.

In some embodiments, the method of detecting one or more columns of the feature matrix to be detected having same feature values forward from a last column comprises: performing steps S202 to S208 a matrix obtained by transposing the feature matrix to be detected and vertically mirroring the transposed matrix as a new feature matrix to be detected, to obtain one or more top rows to be compressed and the number of one or more top rows to be compressed, which are then used as one or more right columns to be compressed and a number of the one or more right columns to be compressed, sameRightCnt.

In step S104, for the feature matrix of the each channel, the feature values of the one or more rows to be compressed and the one or more columns to be compressed are deleted, remaining feature values are reserved as reserved values of the feature matrix of that channel.

For example, a cutting operation is performed on features at edges of the feature matrix F (H*W, i.e. H rows W columns) to delete sameTopCnt top rows, sameBotCnt bottom rows, sameLeftCnt left columns, and sameRightCnt right columns, leaving the feature values F' in a range (H-sameTopCnt-sameBotCnt)*(W-sameLeftCnt-sameRightCnt) as the reserved values of the feature matrix.

In step S106, for the feature matrix of the each channel, the feature values of the one or more rows to be compressed and the one or more columns to be compressed are compressed to obtain one or more edge values of the feature matrix of that channel.

In some embodiments, the feature values of the one or more rows to be compressed and the one or more columns to be compressed are represented with a value that acts as the one or more edge values of the feature matrix of the each channel. If the one or more top rows to be compressed, the one or more bottom rows to be compressed, the one or more left columns to be compressed and the one or more right columns to be compressed corresponds to different feature values respectively, the one or more top rows to be compressed are represented with a value, the one or more bottom rows to be compressed are represented with a value, the one or more left columns to be compressed are represented with a value and the one or more right columns to be compressed are represented with a value.

In step S108, the reserved values and the one or more edge values of the feature matrix of the each channel, as well as a number of the one or more rows to be compressed and a number of the one or more columns to be compressed are encoded and sent to a decoder for restoring the feature matrix of the each channel by the decoder.

For example, a feature matrix of channel i is $F_i$, reserved values are $F_i'$, and one or more edge values are represented as $Q_i$ (if one or more top rows to be compressed, one or more bottom rows to be compressed, l one or more eft columns to be compressed, and one or more right columns to be compressed correspond to different feature values, there may be a plurality of edge values), a number of the one or more rows to be compressed comprises a number of one or more top rows to be compressed sameTopCnt$_i$ and a number of one or more bottom rows to be compressed sameBotCnt$_i$, and a number of one or more columns to be compressed comprises a number of one or more left columns to be compressed sameLeftCnt$_i$ and a number of one or more right columns to be compressed sameRightCnt$_i$. Each channel may have a same number of rows to be compressed and a same number of columns to be compressed.

The reserved values and the one or more edge values of the feature matrix of the each channel, as well as the number of the one or more rows to be compressed and the number of the one or more columns to be compressed, may be entropy encoded to form a bit stream, which is then sent to a decoder.

In the method of the above embodiment, for the feature matrix of the each channel of the image output from the intermediate layer of the neural network, the one or more rows having the same feature values and the one or more columns having the same feature values at edges of the feature matrix are determined as the one or more rows to be compressed and the one or more columns to be compressed; the feature values of the one or more rows to be compressed and the one or more columns to be compressed are deleted to obtain the reserved values of the feature matrix of the each channel; the feature values of the one or more rows to be compressed and the one or more columns to be compressed are compressed to obtain one or more edge values of the feature matrix of the each channel; the reserved values and the one or more edge values of the feature matrix of the each channel, as well as the number of the one or more rows to be compressed and the number of the one or more columns to be compressed, are encoded and sent to a decoder. The decoder can restore the feature matrix of the each channel based on received information. The method of the above embodiment can improve a compression rate of the feature values output by the intermediate layer of the neural network. In deep learning feature encoding for machine vision, the feature matrix of the each channel output by the intermediate layer is compressed by the method of the above embodiment, and can be sent as image feature codes to the decoder for subsequent video processing, thereby improving the efficiency of transmission to the decoder, and reducing transmission latency and bandwidth waste.

In some embodiments, the reserved values and the one or more edge values of the feature matrix of the each channel are compressed in a preset method; and the compressed reserved values and the one or more compressed edge values of the feature matrix of the each channel, as well as the number of the one or more rows to be compressed and the number of the one or more columns to be compressed are encoded. A compression is performed according to the preset method, such as a linear quantization based on a preset bit depth value. The preset method is not limited to the linear quantization, but can be selected according to actual needs, such as a vector quantization, which is not specifically limited to the above examples.

In some embodiments, for the feature matrix of the each channel, an order of magnitude corresponding to the feature matrix of the each channel is determined according to the reserved values and the one or more edge values of the feature matrix of the each channel and a preset bit depth value; the reserved values and the one or more edge values of the feature matrix of the each channel are quantized according to the order of magnitude corresponding to the feature matrix of the each channel to obtain quantified reserved values and one or more quantified edge values as the compressed reserved values and the one or more compressed edge values of the feature matrix of the each channel. For example, if reserved values and one or more edge values of a feature matrix of a channel have a maximum value A and a minimum value B, a quantization level is $M=2^{BD}$, where the BD (preset bit depth) value is a exponent and 2 is a base, an order of magnitude is $\Delta=(A-B)/M$. Quantized reserved values and one or more quantized edge values are obtained by dividing the reserved values and the one or more edge values of the feature matrix of the channel by the order of magnitude, and then rounding down the resulting values.

The method of the above embodiment can achieve further data compression, improving compression rate, further improving transmission efficiency to the decoder, and reducing bandwidth waste.

In some embodiments, the decoder decodes received data to obtain the compressed reserved values and the one or more compressed edge values of the feature matrix of the each channel, as well as the number of the one or more rows to be compressed and the number of the one or more columns to be compressed. The decoder pads with the one or more edge values around the reserved values of the feature matrix of the each channel the number of the one or more rows to be compressed and the number of the one or more columns to be compressed to restore the feature matrix of the each channel. The number of one or more rows to be compressed comprises the number of the one or more top rows to be compressed and the number of the one or more bottom rows to be compressed. The number of columns to be compressed comprises the number of the one or more left columns to be compressed and the number of the one or more right columns to be compressed.

For example, for channel i, sameTopCnt rows of a value $Q_i$, sameBotCnt rows of a value $Q_i$, sameLeftCnt columns of a value $Q_i$, and sameRightCnt columns of a value $Q_i$ are added to the top, bottom, left and right of the reserved values $F_i'$ respectively to restore the feature matrix $F_i$ in its original size.

Figure 3:
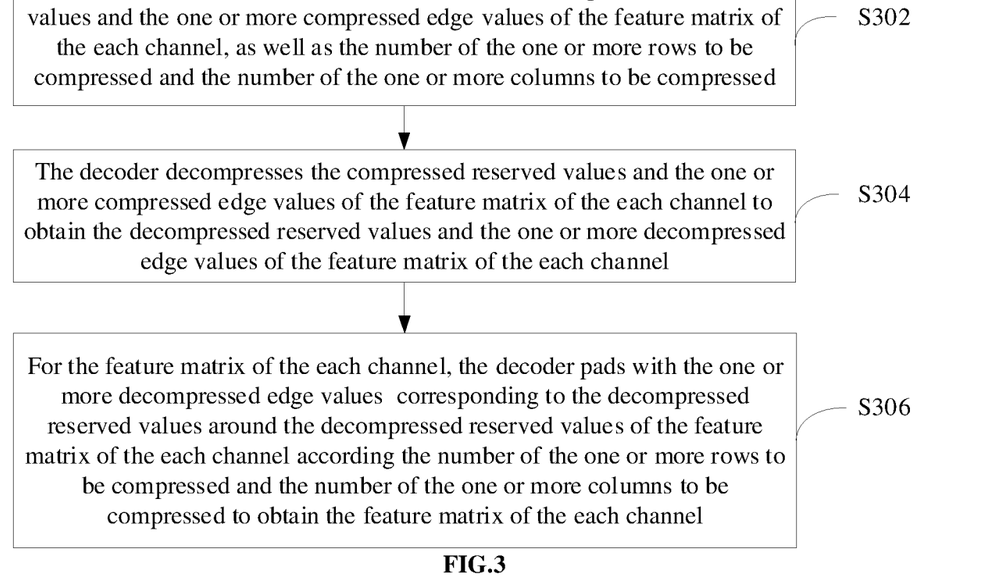
FIG. 3 shows a flowchart of an image processing method according to still other embodiments of the present disclosure.

Furthermore, in some embodiments, as shown in FIG. 3, the processing method after the decoder receives the data comprises steps S302 to S306.

In step S302, the decoder decodes received data to obtain the compressed reserved values and the one or more compressed edge values of the feature matrix of the each channel, as well as the number of the one or more rows to be compressed and the number of the one or more columns to be compressed.

In step S304, the decoder decompresses the compressed reserved values and the one or more compressed edge values of the feature matrix of the each channel to obtain the decompressed reserved values and the one or more decompressed edge values of the feature matrix of the each channel.

In a case of compression using the method described in the above embodiment, the decoder needs to perform decompression using, for example, an inverse quantization method. The data received by the decoder also comprises a quantization parameter (such as an order of magnitude) corresponding to the feature matrix of the each channel. For example, for the feature matrix of the each channel, the order of magnitude corresponding to the feature matrix of the each channel is multiplied by the compressed reserved values and the one or more compressed edge values of the feature matrix of the each channel respectively, to obtain the decompressed reserved values and the one or more decompressed edge values of the feature matrix of the each channel.

In step S306, for the feature matrix of the each channel, the decoder pads with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

In some embodiments, for the feature matrix of the each channel, the decoder pads with the one or more compressed edge values around the compressed reserved values of the feature matrix of the each channel based on the number of the one or more rows to be compressed and the number of the one or more columns to be compressed to obtain a compressed feature matrix of the each channel; and then decompresses the compressed feature matrix to obtain the feature matrix of the each channel.

In the method of the above embodiment, the compression by quantization is advantageous for improving the decoding efficiency of the decoder and the subsequent processing efficiency of the decompressed data.

An application example will be described below.

In this application example, Cascade RCNN ResNet101 is used as an example, with an RGB image of size 5472× 3078×3 as input, and the encoding process is as follows.

1. Extract 64×384×672 intermediate layer features after a first convolutional normalization, and detect rows to be compressed and columns to be compressed on a feature matrix $F_1$ of a first channel to obtain a number of top rows to be compressed, a number of bottom rows to be compressed, a number of left rows to be compressed and a number of right columns to be compressed (sameTopCnt/sameBotCnt/sameLeftCnt/sameRightCnt), for example, (0/7/0/4).

2. Perform a cutting operation on features at edges of the feature matrix $F_i$ of each channel to delete 7 bottom rows and 4 right columns, leaving feature values $F_i'$ in a range of 64×(384−7)×(672−4).

3. Perform a linear quantization on the reserved values $F_i'$, and edge values $Q_i$ (i=0, 1, . . . , 63) of the feature matrix of the each channel under a condition of BD=8, and perform entropy encoding on the linear-quantized reserved values $F_i''$, linear-quantized edge values $Q_i'$, as well as the number of the rows to be compressed and the number of the columns to be compressed, to obtain a bit stream S.

The decoding process is as follows.

1. Decode the bit stream S to obtain quantized reserved values $F_i''$, quantized edge values $Q_i'$, the number of the rows to be compressed and the number of the columns to be compressed, and a quantization parameter.

2. Perform an edge addition operation on the quantized reserved values $F_i''$ by adding 7 rows and 4 columns that have quantized edge values $Q_i'$, at the top and the right respectively to restore a quantized feature matrix $F_i^o$ in an original size.

3. Perform inverse quantization on the feature matrix $F_i^o$ to restore the feature matrix of the each channel.

It is also possible to perform inverse quantization on the quantized reserved values $F_i''$ and the quantized edge values $Q_i'$ before the edge addition operation.

The image processing method of this disclosure can be implemented on an encoder. The structure of the encoder according to some embodiments of the present disclosure will be described below with reference to FIG. 4.

Figure 4:
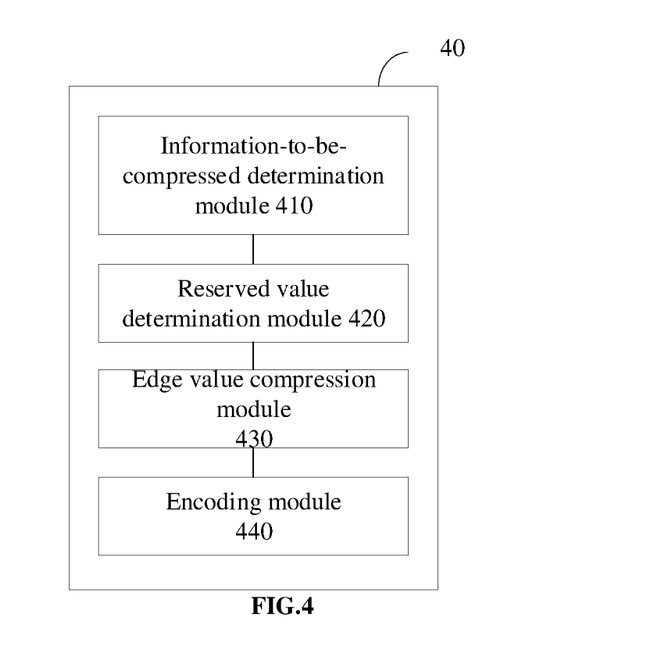
FIG. 4 shows a structural diagram of an encoder according to some embodiments of the present disclosure.

FIG. 4 is a structural diagram of an encoder according to some embodiments of the present disclosure. As shown in FIG. 4, the encoder 40 of this embodiment comprises: an information-to-be-compressed determination module 410, a reserved value determination module 420, an edge value compression module 430, and an encoding module 440.

The information-to-be-compressed determination module 410 is configured to: for a feature matrix of each channel of an image output from an intermediate layer of a neural network, determine one or more rows having same feature values and one or more columns having same feature values at edges of the feature matrix as one or more rows to be compressed and one or more columns to be compressed, wherein the intermediate layer is a layer between an input layer and an output layer.

In some embodiments, the information-to-be-compressed determination module 410 is configured to select a feature matrix of a channel of the image output from the intermediate layer of the neural network as a feature matrix to be detected; detect one or more rows having same feature values, downward from a first row of the feature matrix to be detected and upward from a last row of the feature matrix to be detected respectively, as the one or more rows to be compressed of the feature matrix to be detected, and detect one or more columns having same feature values, backward from a first column of the feature matrix to be detected and forward from a last column of the feature matrix to be detected respectively, as the one or more columns to be compressed of the feature matrix to be detected; and determine one or more rows of the feature matrix of the each channel at a same location as the one or more rows to be compressed of the feature matrix to be detected as one or more rows to be compressed of the feature matrix of the each channel and determine one or more columns of the feature matrix of the each channel at a same location as the one or more columns to be compressed of the feature matrix to be detected as one or more columns to be compressed of the feature matrix of the each channel.

In some embodiments, the information-to-be-compressed determination module 410 is configured to: (1) for the feature matrix to be detected, initialize a number of one or more top rows to be compressed to 0; (2) determine whether feature values of a first row are the same, and if so, increase the number of the one or more top rows to be compressed by 1 and continue with a next row as a current row; (3) determine whether feature values of the current row are the same as a previous row; and if so, increase the number of the one or more top rows to be compressed by 1 and continue with the next row as the current row; (4) repeat step (3) until the feature values of the current row are different from those of the previous row, to obtain one or more top rows to be compressed and the number of the one or more top rows to be compressed; and perform steps (1)-(4) with a matrix obtained by vertically mirroring the feature matrix to be detected as a new feature matrix to be detected, to obtain one or more top rows to be compressed and the number of the one or more top rows to be compressed, which are then used as one or more bottom rows to be compressed and a number of the one or more bottom rows to be compressed.

In some embodiments, the information-to-be-compressed determination module 410 is configured to: perform steps (1)-(4) with a matrix obtained by transposing the feature matrix to be detected as a new feature matrix to be detected, to obtain one or more top rows to be compressed and the number of the one or more top rows to be compressed, which are then used as one or more left columns to be compressed and a number of the one or more left columns to be compressed; and perform steps (1)-(4) with a matrix obtained by transposing the feature matrix to be detected and vertically mirroring the transposed matrix as a new feature matrix to be detected, to obtain one or more top rows to be compressed and the number of one or more top rows to be compressed, which are then used as one or more right columns to be compressed and a number of the one or more right columns to be compressed.

The reserved value determination module 420 is configured to delete, for the feature matrix of the each channel, the feature values of the one or more rows to be compressed and the one or more columns to be compressed, and reserving remaining feature values as reserved values of the feature matrix of the each channel.

The edge value compression module 430 is configured to compress, for the feature matrix of the each channel, the feature values of the one or more rows to be compressed and the one or more columns to be compressed to obtain one or more edge values of the feature matrix of the each channel.

In some embodiments, the edge value compression module 430 is configured to represent the feature values of the one or more rows to be compressed and the one or more columns to be compressed as the one or more edge values of the feature matrix of the each channel.

The encoding module 440 is configured to encode the reserved values and the one or more edge values of the feature matrix of the each channel, as well as a number of the one or more rows to be compressed and a number of the one or more columns to be compressed and send a result of the encoding to a decoder for restoring the feature matrix of the each channel by the decoder.

In some embodiments, the encoding is a entropy encoding.

In some embodiments, the encoding module 440 is configured to compress the reserved values and the one or more edge values of the feature matrix of the each channel in a preset method; and encode the compressed reserved values and the one or more compressed edge values of the feature matrix of the each channel, as well as the number of the one or more rows to be compressed and the number of the one or more columns to be compressed.

In some embodiments, the encoding module 440 is configured to: for the feature matrix of the each channel, determine an order of magnitude corresponding to the feature matrix of the each channel according to the reserved values and the one or more edge values of the feature matrix of the each channel and a preset bit depth value; and quantize the reserved values and the one or more edge values of the feature matrix of the each channel according to the order of magnitude corresponding to the feature matrix of the each channel to obtain quantified reserved values and one or more quantified edge values as the compressed reserved values and the one or more compressed edge values of the feature matrix of the each channel.

The encoder and decoder of this embodiment of the present disclosure may be implemented by various computing devices or computer systems, which will be described below with reference to FIGS. 5 and 6. For the structure of the decoder, reference can be made to the structure of the encoder, which will not be repeated herein.

Figure 5:
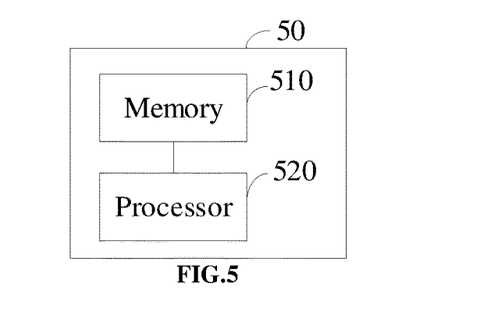
FIG. 5 shows a structural diagram of an encoder according to other embodiments of the present disclosure.

FIG. 5 is a structural diagram of an encoder according to some embodiments of the present disclosure. As shown in FIG. 5, the encoder 50 of this embodiment comprises: a memory 510 and a processor 520 coupled to the memory 510, the processor 520 configured to, based on instructions stored in the memory 510, carry out the image processing method according to any one of the embodiments of the present disclosure.

Wherein, the memory 510 may comprise, for example, system memory, a fixed non-volatile storage medium, or the like. The system memory stores, for example, an operating system, applications, a boot loader, a database, and other programs.

Figure 6:
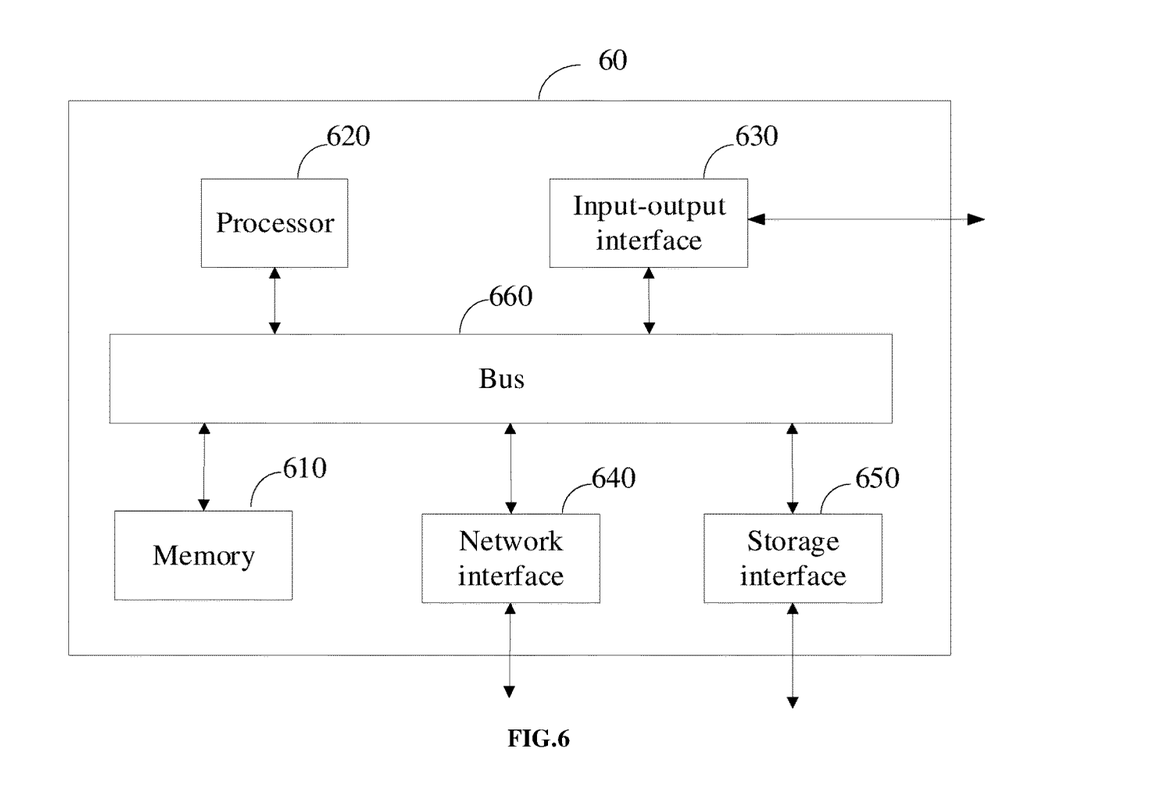
FIG. 6 shows a structural diagram of an encoder according to still other embodiments of the present disclosure.

FIG. 6 is a structural diagram of an encoder according to other embodiments of the present disclosure. As shown in FIG. 5, the encoder 60 of this embodiment comprises: a memory 610 and a processor 620 that are similar to the memory 510 and the processor 520, respectively. It may further comprise an input-output interface 630, a network interface 640, a storage interface 650, and the like. These interfaces 630, 640, 650, the memory 610 and the processor 620 may be connected through a bus 660, for example. Wherein, the input-output interface 630 provides a connection interface for input-output devices such as a display, a mouse, a keyboard, and a touch screen. The network interface 640 provides a connection interface for various networked devices, for example, it can be connected to a database server or a cloud storage server. The storage interface 650 provides a connection interface for external storage devices such as an SD card and a USB flash disk.

The present disclosure also provides an image processing system, which will be described below with reference to FIG. 7.

Figure 7:
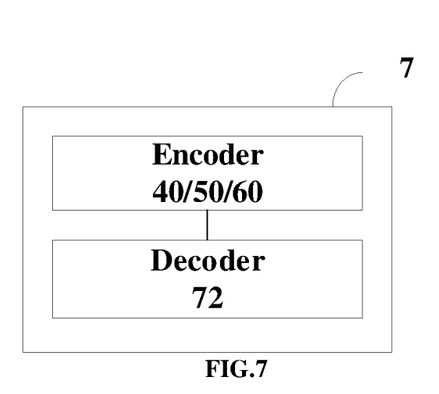
FIG. 7 shows a structural diagram of an image processing system according to some embodiments of the present disclosure.

FIG. 7 is a structural diagram of an image processing system according to some embodiments of the present disclosure. As shown in FIG. 7, the system 7 of this embodiment comprises: an encoder 40/50/60 according to any one of the foregoing embodiments, and a decoder 72.

The decoder 72 is configured to is configured to decode the received data to obtain the compressed reserved values and the one or more compressed edge values of the feature matrix of the each channel, as well as the number of the one or more rows to be compressed and the number of the one or more columns to be compressed; decompress the compressed reserved values and the one or more compressed edge values of the feature matrix of the each channel to obtain the decompressed reserved values and the one or more decompressed edge values of the feature matrix of the each channel; and for the feature matrix of each channel, pad with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

In some embodiments, the received data further comprises an order of magnitude corresponding to the feature matrix of the each channel, which is determined according to the reserved values and the one or more edge values of the feature matrix of the each channel and a preset bit depth value. The decoder 72 is configured to for the feature matrix of the each channel, multiply the order of magnitude corresponding to the feature matrix of the each channel by the compressed reserved values and the one or more compressed edge values of the feature matrix of the each channel respectively, to obtain the decompressed reserved values and the one or more decompressed edge values of the feature matrix of the each channel.

In some embodiments, the encoder is located on an edge computing node, and the decoder is located on a cloud.

The present disclosure further provides a non-transitory computer readable storage medium on which a computer program is stored, wherein the program is executed by a processor to implement the image processing method of any one of the foregoing embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. An image processing method, comprising,
selecting a feature matrix of a channel of an image output from an intermediate layer of a neural network as a feature matrix to be detected, wherein the intermediate layer is a layer between an input layer and an output layer;
detecting one or more rows having same feature values, downward from a first row of the feature matrix to be detected and upward from a last row of the feature matrix to be detected respectively, as the one or more rows to be compressed of the feature matrix to be detected, and detecting one or more columns having same feature values, backward from a first column of the feature matrix to be detected and forward from a last column of the feature matrix to be detected respectively, as the one or more columns to be compressed of the feature matrix to be detected;
determining one or more rows of a feature matrix of each channel at a same location as the one or more rows to be compressed of the feature matrix to be detected as one or more rows to be compressed of the feature matrix of the each channel and determining one or more columns of the feature matrix of the each channel at a same location as the one or more columns to be compressed of the feature matrix to be detected as one or more columns to be compressed of the feature matrix of the each channel, wherein all the feature values in the one or more rows to be compressed of the feature matrix of the each channel are the same and all the feature values in the one or more columns to be compressed of the feature matrix of the each channel are the same;
for the feature matrix of the each channel:
deleting the feature values of the one or more rows to be compressed and the one or more columns to be compressed, and reserving remaining feature values as reserved values of the feature matrix of the each channel;
compressing the feature values of the one or more rows to be compressed and the one or more columns to be compressed to obtain one or more edge values of the feature matrix of the each channel; and
encoding the reserved values and the one or more edge values of the feature matrix of the each channel, as well as a number of the one or more rows to be compressed and a number of the one or more columns to be compressed, and sending a result of the encoding to a decoder for restoring the feature matrix of the each channel by the decoder.

2. The image processing method according to claim 1, wherein the encoding the reserved values and the one or more edge values of the feature matrix of the each channel, as well as a number of the one or more rows to be compressed and a number of the one or more columns to be compressed comprises:
compressing the reserved values and the one or more edge values of the feature matrix of the each channel in a preset method; and
encoding the compressed reserved values and the one or more compressed edge values of the feature matrix of the each channel, as well as the number of the one or more rows to be compressed and the number of the one or more columns to be compressed.

3. The image processing method according to claim 2, wherein the compressing the reserved values and the one or more edge values of the feature matrix of the each channel in a preset method comprises:
for the feature matrix of the each channel, determining an order of magnitude corresponding to the feature matrix of the each channel according to the reserved values and the one or more edge values of the feature matrix of the each channel and a preset bit depth value; and
quantizing the reserved values and the one or more edge values of the feature matrix of the each channel according to the order of magnitude corresponding to the feature matrix of the each channel to obtain quantified reserved values and one or more quantified edge values as the compressed reserved values and the one or more compressed edge values of the feature matrix of the each channel.

4. The image processing method according to claim 1, wherein the detecting one or more rows having same feature values, downward from a first row of the feature matrix to be detected and upward from a last row of the feature matrix to be detected respectively comprises:
(1) for the feature matrix to be detected, initializing a number of one or more top rows to be compressed to 0;
(2) determining whether feature values of a first row are the same, and if so, increasing the number of the one or more top rows to be compressed by 1 and continuing with a next row as a current row;
(3) determining whether feature values of the current row are the same as a previous row; and if so, increasing the number of the one or more top rows to be compressed by 1 and continuing with the next row as the current row;
(4) repeating step (3) until the feature values of the current row are different from those of the previous row, to obtain one or more top rows to be compressed and the number of the one or more top rows to be compressed; and
performing steps (1)-(4) with a matrix obtained by vertically mirroring the feature matrix to be detected as a new feature matrix to be detected, to obtain one or more top rows to be compressed and the number of the one or more top rows to be compressed, which are then used as one or more bottom rows to be compressed and a number of the one or more bottom rows to be compressed.

5. The image processing method according to claim 4, wherein the detecting one or more columns having same feature values, backward from a first column of the feature matrix to be detected and forward from a last column of the feature matrix to be detected respectively comprises:
performing steps (1)-(4) with a matrix obtained by transposing the feature matrix to be detected as a new feature matrix to be detected, to obtain one or more top rows to be compressed and the number of the one or more top rows to be compressed, which are then used as one or more left columns to be compressed and a number of the one or more left columns to be compressed; and performing steps (1)-(4) with a matrix obtained by transposing the feature matrix to be detected and vertically mirroring the transposed matrix as a new feature matrix to be detected, to obtain one or more top rows to be compressed and the number of one or more top rows to be compressed, which are then used as one or more right columns to be compressed and a number of the one or more right columns to be compressed.

6. The image processing method according to claim 1, wherein the compressing the feature values of the one or more rows to be compressed and the one or more columns to be compressed to obtain one or more edge values of the feature matrix of the each channel comprises:

representing the feature values of the one or more rows to be compressed and the one or more columns to be compressed with a value as the one or more edge values of the feature matrix of that channel.

7. The image processing method according to claim 1, wherein the encoding is an entropy encoding.

8. The image processing method according to claim 2, further comprising:

decoding, by the decoder, received data to obtain the compressed reserved values and the one or more compressed edge values of the feature matrix of the each channel, as well as the number of the one or more rows to be compressed and the number of the one or more columns to be compressed;

decompressing, by the decoder, the compressed reserved values and the one or more compressed edge values of the feature matrix of the each channel to obtain the decompressed reserved values and the one or more decompressed edge values of the feature matrix of the each channel; and for the feature matrix of the each channel, padding, by the decoder, with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

9. The image processing method according to claim 8, wherein:

the received data further comprises an order of magnitude corresponding to the feature matrix of the each channel, which is determined according to the reserved values and the one or more edge values of the feature matrix of the each channel and a preset bit depth value; and the decompressing, by the decoder, the compressed reserved values and the one or more compressed edge values of the feature matrix of the each channel comprises:

for the feature matrix of the each channel, multiplying, by the decoder, the order of magnitude corresponding to the feature matrix of the each channel by the compressed reserved values and the one or more compressed edge values of the feature matrix of the each channel respectively, to obtain the decompressed reserved values and the one or more decompressed edge values of the feature matrix of the each channel.

10. An encoder, comprising:
a processor; and
a memory coupled to the processor for storing instructions, which when executed by the processor, cause the processor to execute the image processing method according to claim 1.

11. A non-transitory computer readable storage medium having a computer program stored thereon, wherein the program when executed by a processor implements the steps of the image processing method according to claim 1.

12. An image processing system, comprising: an encoder according to claim 10; and a decoder, wherein the decoder is configured to restoring the feature matrix of the each channel according to received data sent by the encoder.

13. The image processing method according to claim 12, wherein the decoder is configured to decode the received data to obtain the compressed reserved values and the one or more compressed edge values of the feature matrix of the each channel, as well as the number of the one or more rows to be compressed and the number of the one or more columns to be compressed; decompress the compressed reserved values and the one or more compressed edge values of the feature matrix of the each channel to obtain the decompressed reserved values and the one or more decompressed edge values of the feature matrix of the each channel; and for the feature matrix of each channel, pad with the one or more decompressed edge values corresponding to the decompressed reserved values around the decompressed reserved values of the feature matrix of the each channel according the number of the one or more rows to be compressed and the number of the one or more columns to be compressed to obtain the feature matrix of the each channel.

14. The image processing system according to claim 13, wherein: the received data further comprises an order of magnitude corresponding to the feature matrix of the each channel, which is determined according to the reserved values and the one or more edge values of the feature matrix of the each channel and a preset bit depth value; and the decoder is configured to for the feature matrix of the each channel, multiply the order of magnitude corresponding to the feature matrix of the each channel by the compressed reserved values and the one or more compressed edge values of the feature matrix of the each channel respectively, to obtain the decompressed reserved values and the one or more decompressed edge values of the feature matrix of the each channel.

15. The encoder according to claim 10, wherein the determining each row having same feature values and each column having same feature values at edges of the feature matrix comprises:

selecting a feature matrix of a channel of the image output from the intermediate layer of the neural network as a feature matrix to be detected;

detecting one or more rows having same feature values, downward from a first row of the feature matrix to be detected and upward from a last row of the feature matrix to be detected respectively, as the one or more rows to be compressed of the feature matrix to be detected, and detecting one or more columns having same feature values, backward from a first column of the feature matrix to be detected and forward from a last column of the feature matrix to be detected respectively, as the one or more columns to be compressed of the feature matrix to be detected; and determining one or more rows of the feature matrix of the each channel at a same location as the one or more rows to be compressed of the feature matrix to be detected as one or more rows to be compressed of the feature matrix of the each channel and determining one or more columns of the feature matrix of the each channel at a same location as the one or more columns to be compressed of the feature matrix to be detected as one or more columns to be compressed of the feature matrix of the each channel.

16. The encoder according to claim 10, wherein the encoding the reserved values and the one or more edge values of the feature matrix of the each channel, as well as a number of the one or more rows to be compressed and a number of the one or more columns to be compressed comprises:

compressing the reserved values and the one or more edge values of the feature matrix of the each channel in a preset method; and encoding the compressed reserved values and the one or more compressed edge values of the feature matrix of the each channel, as well as the number of the one or more rows to be compressed and the number of the one or more columns to be compressed.

17. The encoder according to claim 16, wherein the compressing the reserved values and the one or more edge values of the feature matrix of the each channel in a preset method comprises:

for the feature matrix of the each channel, determining an order of magnitude corresponding to the feature matrix of the each channel according to the reserved values and the one or more edge values of the feature matrix of the each channel and a preset bit depth value; and quantizing the reserved values and the one or more edge values of the feature matrix of the each channel according to the order of magnitude corresponding to the feature matrix of the each channel to obtain quantified reserved values and one or more quantified edge values as the compressed reserved values and the one or more compressed edge values of the feature matrix of the each channel.

18. The encoder according to claim 15, wherein the detecting one or more rows having same feature values, downward from a first row of the feature matrix to be detected and upward from a last row of the feature matrix to be detected respectively comprises:

(1) for the feature matrix to be detected, initializing a number of one or more top rows to be compressed to 0;

(2) determining whether feature values of a first row are the same, and if so, increasing the number of the one or more top rows to be compressed by 1 and continuing with a next row as a current row;

(3) determining whether feature values of the current row are the same as a previous row; and if so, increasing the number of the one or more top rows to be compressed by 1 and continuing with the next row as the current row;

(4) repeating step (3) until the feature values of the current row are different from those of the previous row, to obtain one or more top rows to be compressed and the number of the one or more top rows to be compressed; and performing steps (1)-(4) with a matrix obtained by vertically mirroring the feature matrix to be detected as a new feature matrix to be detected, to obtain one or more top rows to be compressed and the number of the one or more top rows to be compressed, which are then used as one or more bottom rows to be compressed and the number of the one or more bottom rows to be compressed.

\* \* \* \* \*